United States Patent
Gray-Donald et al.

(10) Patent No.: US 9,501,512 B2
(45) Date of Patent: *Nov. 22, 2016

(54) OPTIMIZING STORAGE IN A PUBLISH / SUBSCRIBE ENVIRONMENT

(71) Applicant: International Business Machines Corporation, Armonk, NY (US)

(72) Inventors: Trent A. Gray-Donald, Ottawa (CA); Rajesh Lalgowdar, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,631

(22) Filed: Mar. 25, 2016

(65) Prior Publication Data
US 2016/0196293 A1    Jul. 7, 2016

Related U.S. Application Data

(63) Continuation of application No. 13/893,813, filed on May 14, 2013.

(51) Int. Cl.
| G06F 7/00 | (2006.01) |
| G06F 17/00 | (2006.01) |
| G06F 17/30 | (2006.01) |
| H04L 29/08 | (2006.01) |

(52) U.S. Cl.
CPC ..... *G06F 17/30345* (2013.01); *G06F 17/3089* (2013.01); *H04L 67/26* (2013.01)

(58) Field of Classification Search
CPC .................. G06F 17/30265; G06F 17/30867; G06F 17/30256; G06F 17/3089
See application file for complete search history.

(56) References Cited

U.S. PATENT DOCUMENTS

| 7,181,482 B2 | 2/2007 | Jain et al. |
| 7,203,706 B2 | 4/2007 | Jain et al. |
| 7,640,357 B2 | 12/2009 | Kirov et al. |
| 8,028,085 B2 | 9/2011 | Elien et al. |
| 8,060,565 B1 | 11/2011 | Swartz |
| 8,095,598 B2 | 1/2012 | Follmeg et al. |
| 2004/0205770 A1 | 10/2004 | Zhang et al. |
| 2005/0096928 A1 | 5/2005 | Ruggaber et al. |
| 2006/0015904 A1 | 1/2006 | Marcus |
| 2008/0052623 A1 | 2/2008 | Gutfleisch |
| 2008/0270575 A1 | 10/2008 | Rodriguez |
| 2009/0006202 A1 | 1/2009 | Alroy |

(Continued)

OTHER PUBLICATIONS

Eugster et al. "The Many Faces of Publish/Subscribe", ACM Computing Surveys, vol. 35, No. 2, Jun. 2003, pp. 114-131.

(Continued)

*Primary Examiner* — Susan Chen
(74) *Attorney, Agent, or Firm* — David B. Woycechowsky (57) ABSTRACT

Creating message files in a publication subscription computer system by: (i) receiving data corresponding to a first message; (ii) receiving a list of subscribers that subscribe to a topic of the first message; and (iii) creating a digital data file that includes a payload data and a consumption metadata. The payload data includes content data corresponding to the first message. The consumption metadata includes data relating to whether one or more subscribers of the list of subscribers will potentially consume the first message at a later period in time from the time of receiving the content data corresponding to the first message.

1 Claim, 2 Drawing Sheets

(56) References Cited

U.S. PATENT DOCUMENTS

| | | | |
|---|---|---|---|
| 2009/0249228 A1* | 10/2009 | Cheng | G06F 3/0481 715/758 |
| 2009/0307592 A1* | 12/2009 | Kalanithi | G06F 3/002 715/716 |
| 2010/0046842 A1* | 2/2010 | Conwell | G06F 17/30265 382/218 |
| 2011/0047230 A1 | 2/2011 | McGee | |
| 2012/0180083 A1 | 7/2012 | Marcus | |
| 2013/0066891 A1 | 3/2013 | Boldyrev et al. | |
| 2014/0208391 A1 | 7/2014 | Farnsworth et al. | |
| 2014/0344314 A1 | 11/2014 | Gray-Donald et al. | |

OTHER PUBLICATIONS

IBM, "Multiple consumption of queued messages", ip.com, An IP.com Prior Art Database Technical Disclosure, Jun. 14, 2005, IPCOM000125711D.

"A method to create and maintain shared messages in a message queuing system", ip.com, An IP.com Prior Art Database Technical Disclosure, IPCOM000219092D, Jun. 19, 2012, pp. 1-5.

* cited by examiner

An OPTIMIZING STORAGE IN A PUBLISH / SUBSCRIBE ENVIRONMENT

FIELD OF THE INVENTION

The present disclosure relates generally to the field of storage of data, and more particularly to storage of data in a publish/subscribe environment.

BACKGROUND OF THE INVENTION

In the messaging domain there are two basic models for exchanging of data between applications: (i) point to point; and (ii) publish/subscribe (pub/sub) model. In a point to point model system, a queue acts as a central point to which producers send messages and consumers connected to this queue retrieve messages. In the pub/sub model, a "topic" is an organizing construct. In pub/sub, publishers and subscribers connect to a topic to produce and consume messages. One difference between point to point model system and pub/sub model system is that: (i) in a pub/sub model system, multiple subscribers subscribe to a given topic and every message published to the topic will be "federated" to all the subscribers of that given topic (subject to validation and message selector criteria); whereas (ii) in a point to point model system, only a designated consumer will consume any message and the message is not automatically duplicated or federated across multiple consumers.

The pub/sub model supports two types of subscriptions: (i) durable; and (ii) non-durable. A non-durable subscriber is very much specific to its connection. That is, subsequent to a loss, or closure, of the connection over which the non-durable subscription was created: (i) the non-durable subscriber is automatically de-registered/removed; and (ii) all the messages for that non-durable subscriber that were unconsumed are discarded by the messaging engine. In the case of the durable subscriber, the messaging engine keeps all unconsumed messages of a durable subscriber until the durable subscriber consumes them. A durable subscriber, once registered, can connect to the topic anytime and disconnect any time because it is the responsibility of the messaging engine to persist all the messages published on a particular topic during interval(s) when the subscriber is inactive. Once the subscriber reconnects, the messaging engine will deliver all the stored messages to the subscriber. Once the subscriber consumes the messages, the messaging engine will remove that message from its persistence layer.

SUMMARY

According to an aspect of the present invention, there is a method for creating message files in a publication subscription computer system. The method includes the following actions (not necessarily in the following order): (i) receiving data corresponding to a first message; (ii) receiving a list of subscribers that subscribe to a topic of the first message; and (iii) creating a digital data file that includes a payload data and a consumption metadata. The payload data includes content data corresponding to the first message. The consumption metadata includes data relating to whether one or more subscribers of the list of subscribers will potentially consume the first message at a later period in time from the time of receiving the content data corresponding to the first message.

DETAILED DESCRIPTION

This DETAILED DESCRIPTION section will be divided into the following sub-sections: (i) The Hardware and Software Environment; (ii) Operation of Embodiment(s) of the Present Disclosure; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
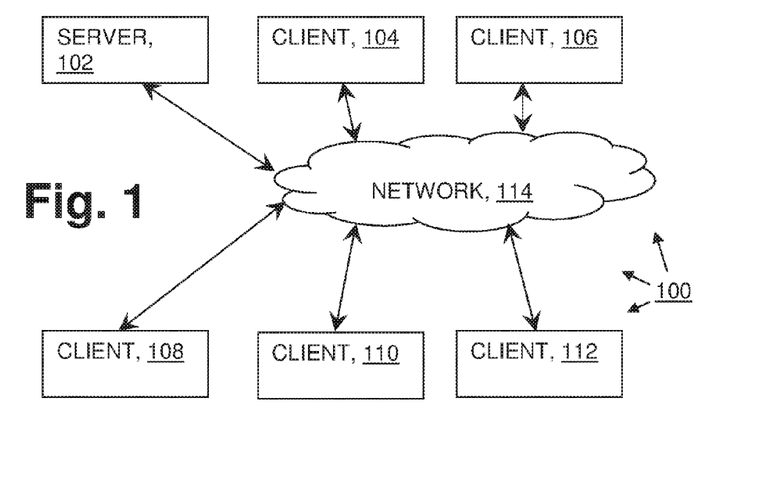
FIG. 1 is a schematic view of a first embodiment of a computer system (that is, a system including computer(s)) according to the present disclosure.
Figure 2:
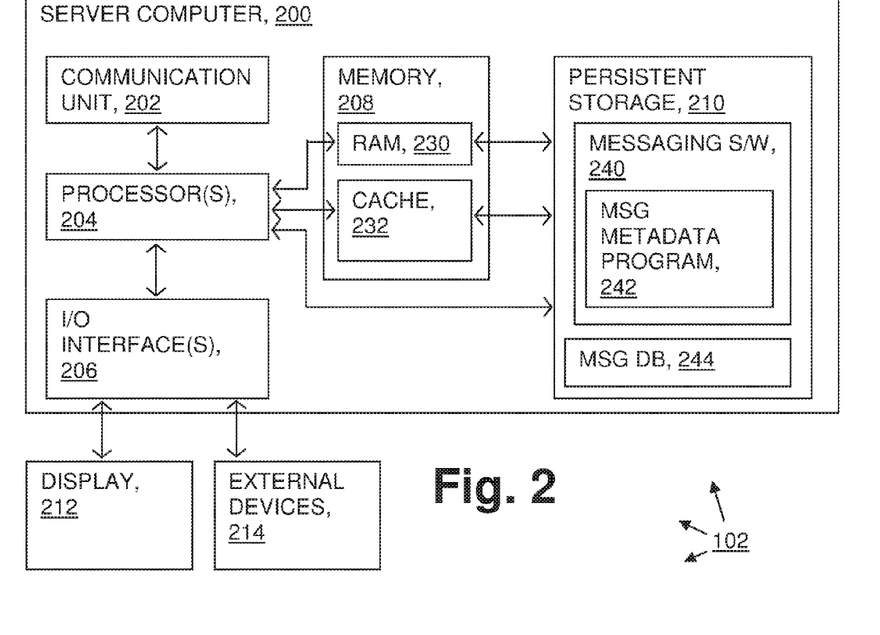
FIG. 2 is a schematic view of a portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) unit 206; memory device 208; persistent storage device 210; display device 212; external device set 214; random access memory (RAM) devices 230; cache memory device 232; messaging software 240; message metadata program 242; and messages database 244.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Messaging software 240 is a representative piece of software, and is a collection of machine readable instructions and data that is used to create, manage and control certain software functions that will be discussed in detail, below, in the Operation Of the Embodiment(s) sub-section of this DETAILED DESCRIPTION section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Software 240 is in many respects representative of the various software modules of the present invention and is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client subsystems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Disclosure

Preliminary note: The flowchart and block diagrams in the following Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
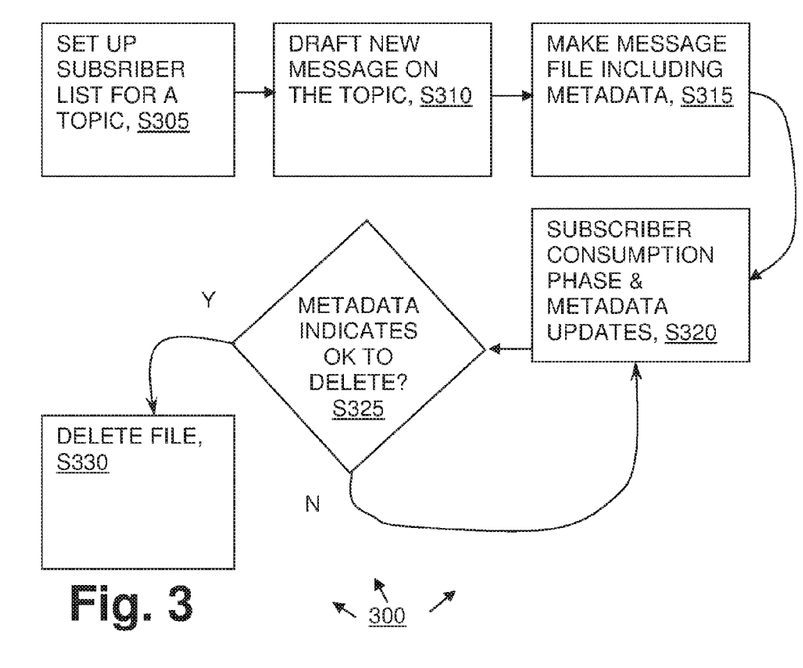
FIG. 3 is a flowchart showing a process according to the present disclosure.
Figure 4:
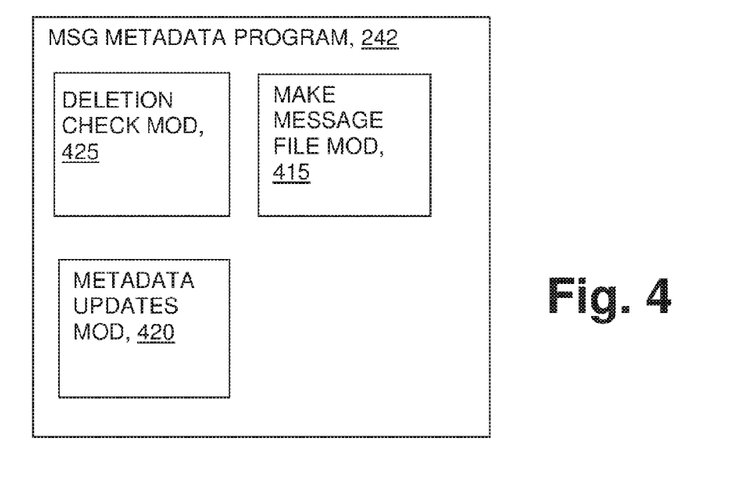
FIG. 4 is a schematic view of a portion of the first embodiment computer system.

Operation of an embodiment of the present disclosure will now be described with reference mostly to FIG. 3 (flowchart 300) and FIG. 4 (a block diagram of message metadata program 242).

Processing begins at step S305 where messaging software 240 (see FIG. 2) sets up a subscriber list for a designated topic. In this embodiment, this step is performed by conventional techniques as discussed above in the BACKGROUND section.

Processing proceeds to step S310 where a user (not shown, see Definitions sub-section of this DETAILED DESCRIPTION section) authors a message, using client computer sub-system 104 (see FIG. 1) and relating to the designated topic, for distribution in a pub/sub manner by messaging software 240 (see FIG. 2). The text of the message is received by messaging software 240 through network 114 (see FIG. 1). Again, in this embodiment, this step is accomplished by conventional methods and techniques.

Processing proceeds to step S315 where make message file module 415 of message metadata program 242 (see FIG. 4) of messaging software 240 (see FIG. 2) makes a message file in the form of digital data corresponding to the message. Of course, the text of the message was likely received in the form of digital data (after all, it was transmitted over network 114), but at step S315, certain metadata (sometimes referred to as "consumption metadata") is added to the message so that one file contains both: (i) digital data representing the text, images, audio, video, etc. of the message; and (ii) the message metadata. The metadata indicates which subscribers have consumed the message of which the metadata is now a constituent part. Mod 415 stores the message, with the metadata, in message database 244 (see FIG. 2).

In some embodiments, the metadata for each subscriber is a single dedicated bit, but other embodiments may have more or less consumption metadata. There may be other types of metadata in the message file (of metadata types and/or content currently conventional or to be developed in the future), in addition to the consumption metadata of the present disclosure. In some single-bit-per-subscriber embodiments the single bit for each subscriber is: (i) set at a first binary value when the subscriber is still expected to potentially consume the message in the future; and (ii) set at the other value if the subscriber is not expected to potentially consume the message in the future (for example, because the user has already consumed the message and therefore cannot consume it again).

Processing proceeds to step S320 where subscribers (not shown) on the subscriber list (not separately shown) consume the message through various client sub-systems, such as client sub-systems 104, 106, 108, 110, 112 (see FIG. 1). The consumption of the message is conventional in this embodiment, and accomplished by conventional publish and subscribe distribution techniques, but at step S320 the metadata of the message is updated by metadata updates mod 420 of message metadata program 242 (see FIG. 4) of messaging software 240. Specifically, the metadata is updated when: (i) a subscriber consumes the message; and/or (ii) there is some reason to believe that the subscriber will not ever consume the message (for example, subscriber dies, subscriber declines particular message, subscriber unsubscribes, etc.) this metadata, and this updating of the metadata is not believed to be conventional. Mod 420 replaces the message, when updates to the metadata occur, in message database 244 (see FIG. 2).

Processing will intermittently proceed from step S320 to step S325 where deletion check mod 425 of message metadata program 242 (see FIG. 4) of messaging software 240 (see FIG. 2) check the metadata of the message to determine whether the message should be deleted from the database. This check may occur, for example, every time a subscriber consumes the message. In this embodiment, the message will be deleted when for every subscriber: (i) the subscriber has consumed the message; and/or (ii) there is some reason to believe that the subscriber will not ever consume the message (for example, messages get expired, non-durable subscriber dies, subscriber declines particular message, subscriber unsubscribes, etc.). Alternatively, there could be other rules for deletion based on the content of the metadata. For example, the message could be deleted when 75 percent of the subscribers have consumed the message. The exact characteristics of the deletion rule will depend upon the specific pub/sub application.

On condition that step S325 determines that the message is to be deleted, then processing proceeds to step S330 where mod 425 instructs the message to be deleted from message database 244 (see FIG. 2).

III. Further Comments and/or Embodiments

Pub/sub has been adopted by many large domains (banking, insurance, stocks, industry solutions, telecom, airline industry, customs, etc.) and industries. In today's messaging world, which includes cloud, elastic messaging, it is quite possible for a single topic to have thousands of durable subscribers, or even hundreds of thousands of durable subscribers, registered. As the number of subscribers increases for a topic, the required computer resources to store, maintain, organize and manage messages for inactive durable subscribers (herein sometimes referred to as "overhead") can grow large. It may even grow at an exponential rate.

To clearly understand the problem of required overhead for inactive subscribers in a pub/sub model system, consider the following topology: (i) Topic=Stocks; (ii) Publisher=10 Publishers publishing; (iii) Throughput=1 Message published per second per Publisher; (iv) every second 10 messages are published (that is, 1 message/second/Publisher*10 Publishers); (v) Subscribers=10,000 durable subscribers subscribed to Stocks topic; and (vi) Message Size=1 kilobyte (KB). In an idealized environment, it is anticipated that all the 10,000 subscribers are active and consuming messages. However, due to various conditions, not all the subscribers would typically be actively consuming messages, and, in a worst case scenario all of the durable subscribers are inactive. This inactivity forces the messaging engine to persist the messages for some (or even all) durable subscribers.

Some potential business value of some embodiments of the present disclosure will now be discussed. The wide adoption of the pub/sub model, and the high end business applications used in conjunction with pub/sub, means that a pub/sub model system may support well over 10,000 durable subscribers registered on a given topic. One potential problem is the significant usage of disk space to store the messages for the inactive subscribers. Messages may be published at rates exceeding even 10 messages per second, and at least some topics may have well over 100,000 durable subscribers registered. When these durable subscribers fail to connect, this can cause the messaging engine to run out of disk space (or other data storage space). Running out of storage space potentially causes messages to be lost, which is a very bad outcome, especially when the messages are considered to be important by the publishers and/or their subscribers.

Some embodiments of the present disclosure provide an optimized way for storing messages for the inactive subscribers without maintaining any message references and without duplicating the messages for all the subscribers. In this way, the messaging engine does not have to use up lot of disk space.

In order to give an idea of some of the data sizes that can be involved in a pub/sub system, some examples and related Tables will now be set forth.

First Example

Assume that a single 1 kilobyte (KB) sized message is published for 10,000 subscribers. Because each of the subscribers is represented as one (1) bit, 10,000 bits in this message would be allocated to its subscribers. (Note: 8 bits=1 byte, and 10,000 bits=1250 bytes.) 1 (KB) msg*10,000 (bits)=1 (KB) msg*1250 (bytes)=2.22 KB. For 1000 messages published: 1 KB*1000 msgs*1250 (bytes)=1.19 megabytes (MB). In this way, an embodiment of the present disclosure can use only a relatively small amount of data storage space in this First Example.

Further Examples

A comparison between various pub-sub models will now be set forth to present further examples of the dynamics of storage space as between different pub/sub models. This comparison will focus on how much space is required to store the message references for the subscriber messages. In this comparison, each message is considered to be 1 KB in size. The comparison will be made by way of tables, with: (i) Table 1 corresponding to a product called Websphere MQ; (ii) Table 2 corresponding to another currently conventional product and/or service; and (iii) Table 3 corresponding to an embodiment of the present disclosure.

TABLE 1

| | (Websphere MQ): | | | |
|---|---|---|---|---|
| | 10 Subscribers | 100 Subscribers | 1000 Subscribers | 10000 Subscribers |
| 1 Msg | 0.009765625 MB | 0.09765625 MB | 0.9765625 MB | 9.765625 MB |
| 100 Msgs | 0.9765625 MB | 9.765625 MB | 97.65625 MB | 976.5625 MB |
| 1000 Msgs | 9.765625 MB | 97.65625 MB | 976.5625 MB | 9765.625 MB |
| 10000 Msgs | 97.65625 MB | 976.5625 MB | 9765.625 MB | 97656.25 MB |

TABLE 2

|  | 10 subscribers | 100 subscribers | 1000 subscribers | 10000 subscribers |
|---|---|---|---|---|
| 1 Msg | 0.004791 MB | 0.039124 MB | 0.382446 MB | 3.815674 MB |
| 100 Msgs | 0.479126 MB | 3.912354 MB | 38.24463 MB | 381.5674 MB |
| 1000 Msgs | 4.79126 MB | 39.12354 MB | 382.4463 MB | 3815.674 MB |
| 10000 Msgs | 47.9126 MB | 391.2354 MB | 3824.463 MB | 38156.74 MB |

TABLE 3

(an embodiment of the present disclosure):

|  | 10 subscribers | 100 subscribers | 1000 subscribers | 10000 subscribers |
|---|---|---|---|---|
| 1 Msg | 0.000978 MB | 0.000988483 MB | 0.001096 MB | 0.002169 MB |
| 100 Msgs | 0.097775 MB | 0.098848343 MB | 0.109577 MB | 0.216866 MB |
| 1000 Msgs | 0.977755 MB | 0.988483429 MB | 1.095772 MB | 2.168655 MB |
| 10000 Msgs | 9.777546 MB | 9.88483429 MB | 10.95772 MB | 21.68655 MB |

As a comparison of Tables 1, 2 and 3 reveals, some embodiments of the present disclosure will require much less data storage space than conventional products and/or services.

Some embodiments of the present disclosure provide a solution that enables the messaging engine to have one or more of the following features: (i) store the subscribers information within each individual messages; (ii) from the message itself to know the list of subscribers who have consumed the messages; (iii) remove the master copy message once all the subscribers consume the message by using the information stored within the message; (iv) assign missing bit values to new subscribers thereby filling the gaps in between; and/or (v) reordering of the bit values within the messages and the subscriber references to fill up the gaps for the existing subscribers.

Some embodiments ensure that there is not a need to store any additional message references, nor to duplicate the messages across all the subscribers, thereby ensuring that the messaging engine does not consume a lot of unnecessary data storage space.

In the subscriber registration phase, when the durable subscriber registers for the first time, it is assigned a unique bit value in an incremental order. For example, if there are 10 subscribers registering, each of the subscribers will be assigned the unique bit as shown below in Table 4:

| Subscriber | Bit Value | Status |
|---|---|---|
| S1 | 1 | 0 |
| S2 | 2 | 0 |
| S3 | 3 | 0 |
| S5 | 4 | 0 |
| S8 | 5 | 0 |
| S4 | 6 | 0 |
| S6 | 7 | 0 |
| S7 | 8 | 0 |
| S9 | 9 | 0 |
| S10 | 10 | 0 |

The allocation of the bit value to a particular subscriber is done during the subscriber registration. This bit value is uniquely used by the messaging engine to map the messages to a particular subscriber. The messaging engine will store the bit value information along with the durable subscriber in its persistence layer, so that it can be recovered in the event of the failure. In Table 4: (i) Status 0=Registered; and (ii) Status 1=Unregistered. At the point that Table 4 is generated, the messaging engine knows there are 10 durable subscribers registered on this specific topic, which means: (i) Total Subscription Count (TSC)=10; and (ii) Max Bit Value (MBV)=10.

The message publication phase will now be discussed. Whenever a message is published for this topic, the messaging engine checks the total subscription count (TSC) and max bit value (MBV) to determine how many bits must be allocated for this message. Note that each of the bits represents a particular subscriber reference. Ideally, the MBV must be equal to the TSC, but there could be situations where this value could differ (as will be explained in detail later).

Table 5 shows Msg1 contents (where each bit represents a unique specific subscriber:

Message Header Properties
Default properties
Application specific Properties
0   0   0   0   0   0   0   0   0   0
Message Pay Load In the Subscriber Reference row(s), each bit represents the specific subscriber. In Table 5: (i) a value of 0 represents the fact that the message is not yet consumed by that particular subscriber; and (ii) a value of 1 serves to indicate the message has been consumed by that particular subscriber. In some embodiments, to ensure that performance is not hampered very much due to storing the bit values, usage of SSD (solid state drives) are used to store the message header information, while the payload is written into a persistent disk drive storage device. The message is preferably stored as 3 parts: (i) message headers, (ii) subscriber reference, and (iii) message pay load. In this embodiment, it will be required that the message bit value is regularly updated indicating a particular subscriber has consumed the message. For this reason, usage of SSD to store the message headers and message bit values will ensure the performance is not impacted.

The event of a new subscriber being added will now be discussed. After the first message is published, assume a new subscriber is created. The messaging engine identifies this to be a new subscriber and creates a new bit value as shown below in Table 6:

| Subscriber | Bit Value | Status |
| --- | --- | --- |
| S1 | 1 | 0 |
| S2 | 2 | 0 |
| S3 | 3 | 0 |
| S4 | 4 | 0 |
| S5 | 5 | 0 |
| S6 | 6 | 0 |
| S7 | 7 | 0 |
| S8 | 8 | 0 |
| S9 | 9 | 0 |
| S10 | 10 | 0 |
| S11 | 11 | 0 |

In Table 6: (i) Total Subscription Count (TSC)=11; and (ii) Max Bit Value (MBV)=11.

A new message published after the new subscriber was added as shown below in Table 7:

Msg1 contents:
Message Header Properties
Default properties
Application specific Properties
0    0    0    0    0    0    0    0    0    0
Message Pay Load
Msg2 contents:
Message Header Properties
Default properties
Application specific Properties
0    0    0    0    0    0    0    0    0    0    0
Message Pay Load In the Subscriber Reference row(s), each bit represents the specific subscriber. From the above 2 messages of Table 7, it can be seen that Msg1 does not have the 11th bit for the Subscriber 11, where as only Msg2 has the Subscriber 11th bit. This ensures that Msg1 is never delivered to Subscriber 11, because Msg1 was published before Subscriber 11 was created.

An embodiment of the process of a subscriber consuming the messages will now be discussed. The subscriber can connect at any point to consume the messages. In a typical situation, a subscriber might be active for long duration to consume all the published messages. As the subscriber becomes active and starts consuming the message, the messaging engine updates the subscriber bit appropriately to indicate the message was consumed by a particular subscriber. For example, assume that S1, S2 and S7 are active and consuming the messages. After the messages are consumed by these subscribers, the corresponding bits would be updated as shown below in Table 8 for both the messages:

Msg1 contents:
Message Header Properties
Default properties
Application specific Properties
1    1    0    0    0    0    1    0    0    0
Message Pay Load
Msg2 contents:
Message Header Properties
Default properties
Application specific Properties
1    1    0    0    0    0    1    0    0    0    0
Message Pay Load In the Subscriber Reference row(s), each bit represents the specific subscriber. In the above 2 messages, bits 1, 2 and 7 are now filled with a value "1," indicating that these subscribers (S1, S2 and S7) have consumed Msg1 and Msg2. So next time when these subscribers request for the message, Msg1 and Msg2 will not be given to these subscribers. As the subscribers start consuming the messages, the messaging engine maintains a count about how many subscribers actually consumed a particular message. This is potentially important because, until all the subscribers have actually consumed the messages, the messaging engine cannot remove the master copy. So the messaging engine uses the "Total Subscribers Consumed Count (TSCC)" for each of the message. In the above example, after the 3 subscribers have consumed the messages, the count will be like this: (i) Total Subscription Count (TSC)=11; and (ii) Max Bit Value (MBV)=11; (iii) Msg1: TSCC=3; (iv) Msg1: TSC=10; (v) Msg2: TSCC=3; and (vi) Msg2: TSC=11. As more and more subscribers consume the messages, the Total Subscribers Consumed Count (TSCC) is incremented. Once all the subscribers consume a particular message, for example Msg1, the message representation for Msg1 is shown below in Table 9:

Message Header Properties
Default properties
Application specific Properties
1    1    1    1    1    1    1    1    1    1
Message Pay Load In the Subscriber Reference row(s), each bit represents the specific subscriber. In this example: (i) Total Subscription Count (TSC)=11; (ii) Max Bit Value (MBV)=11; (iii) Msg1: TSCC=10; and (iv) Msg1: TSC=10. Once the last subscriber consumes the message (not particularly in any order), that is, when the TSCC value is equal or greater than TSC, it is safe for the messaging engine to remove Msg1, since it has been delivered to all the subscribers.

An embodiment of the process of identifying the last message seen while consuming the messages will now be discussed. It can be helpful for the messaging engine to have an indication of which was the last message that was successfully delivered to the consumer, so that the next time the subscriber requests for a message, the messaging engine can quickly identify the position from where it has to scan a matching message for the subscriber. This can be accomplished by maintaining the reference (or the position) of the last index of the message that was delivered to the subscriber. This information is not required to be persisted into the backend layer, due to performance hindrances. This information is retained by the messaging engine in its heap/memory.

An embodiment of the process of deleting/unregistering a subscriber phase will now be discussed. It is quite possible that the subscriber can reconnect at any point and instead of consuming the messages, the subscriber instead communicates to the client that it wants to unregister itself without consuming any further messages. In this case, the messaging engine must include logic to identify this request and ensure that the message is marked as delivered for this subscriber. An example of this will now be discussed. Subscriber 4 and Subscriber 10 request the messaging to unregister. Once the request comes, the messaging engine marks the bits 4 and 10 as 1 indicating this message has been delivered (note: it is not actually delivered to the subscriber, but an indication is made to the messaging engine that this message need not be again delivered to subscriber 4 and 10). Before the subscribers unregister, Msg2 contents are as shown below in Table 10:

Msg2 contents:
Message Header Properties
Default properties
Application specific Properties
1 1 0 0 0 0 1 0 0 0 0
Message Pay Load After the subscribers unregister, Table 11 applies:

| Subscriber | Bit Value | Status |
|---|---|---|
| S1 | 1 | 0 |
| S2 | 2 | 0 |
| S3 | 3 | 0 |
| S4 | 4 | 1 |
| S5 | 5 | 0 |
| S6 | 6 | 0 |
| S7 | 7 | 0 |
| S8 | 8 | 0 |
| S9 | 9 | 0 |
| S10 | 10 | 1 |
| S11 | 11 | 0 |

At this point: (i) Total Subscription Count (TSC)=9; (ii) Max Bit Value (MBV)=11. Now there is a difference in the TSC and MBV values. While the MBV is at 11, the TSC has dropped down to 9 because of the subscribers that have unregistered. Msg2 contents are shown below in Table 12:

Message Header Properties
Default properties
Application specific Properties
1 1 0 1 0 0 1 0 0 1
Message Pay Load At this point: (i) Total Subscription Count (TSC)=11; (ii) Max Bit Value (MBV)=11; (iii) Msg2: TSCC=5; and (iv) Msg2: TSC=11. Once the subscribers requests to unregister, it is safe for the messaging engine to asynchronously update the bit values to 1, because there is no reference for Subscriber 4 and 10 that is stored in the messaging engine.

An embodiment of a process where a new message is published after the subscribers are unregistered will now be discussed. At this point, there are only 9 subscribers registered with the messaging engine, because Subscriber 4 and 10 are unregistered, and Table 13, below, applies:

| Subscriber | Bit Value | Status |
|---|---|---|
| S1 | 1 | 0 |
| S2 | 2 | 0 |
| S3 | 3 | 0 |
| S5 | 5 | 0 |
| S6 | 6 | 0 |
| S7 | 7 | 0 |
| S8 | 8 | 0 |
| S9 | 9 | 0 |
| S11 | 11 | 0 |

At this point: (i) Total Subscription Count (TSC)=9; and (ii) Max Bit Value (MBV)=11. Under such scenarios (that is, when Subscriber 4 and Subscriber 10 are unregistered), it is important, in this embodiment, for the messaging engine to update the bit value 4 and 10 to 1, indicating message need not be delivered to these subscribers. For this reason, the messaging engine will update Msg3 contents as shown, below, in Table 14:

Message Header Properties
Default properties
Application specific Properties
0 0 0 1 0 0 0 0 0 1 0
Message Pay Load Bit 4 and Bit 10 are automatically set to 1 so that Subs 4 and 10 will not get the messages. At this point: (i) Total Subscription Count (TSC)=9; (ii) Max Bit Value (MBV)=11; (iii) Msg3: TSCC=0; and (iv) Msg3: TSC=9. In this case, even though the MBV is 11, TSC is only 9. For this reason, when the TSCC value becomes 9 (that is, 9 subscribers consumed this message), the messaging engine can safely remove this message.

An embodiment of the process of assigning missing bit values to new subscribers will now be discussed. As the various subscribers register and unregister, there could be lot of missing bit values in between. This can potentially cause a problem, because the bit values for newly added subscribers will be added towards the end of the list. This will unnecessarily cause the total bit values to increase more than they really need to. For this reason, it can be helpful that as new subscribers are added, the messaging engine has logic to fill up these missing bits. Continuing the above example, 3 new subscribers are added (after Sub 4 and Sub 10 are unregistered). Initial Bit value representations for subscribers are shown below in Table 15:

| Subscriber | Bit Value | Status |
|---|---|---|
| S1 | 1 | 0 |
| S2 | 2 | 0 |
| S3 | 3 | 0 |
| S5 | 5 | 0 |
| S6 | 6 | 0 |
| S7 | 7 | 0 |
| S8 | 8 | 0 |
| S9 | 9 | 0 |
| S11 | 11 | 0 |

Table 16 represents the data after 3 new subscribers (Sub12, Sub13 and Sub14 are added):

| Subscriber | Bit Value | Status |
|---|---|---|
| S1 | 1 | 0 |
| S2 | 2 | 0 |
| S3 | 3 | 0 |
| S4 | 4 | 0 |
| S5 | 5 | 0 |
| S6 | 6 | 0 |
| S7 | 7 | 0 |
| S8 | 8 | 0 |
| S9 | 9 | 0 |
| S10 | 10 | 0 |
| S11 | 11 | 0 |
| S12 | 12 | 0 |

At this point: (i) Total Subscription Count (TSC)=12; and (ii) Max Bit Value (MBV)=12. From the above representation, it can be seen that when 3 new subscribers were added, the messaging engine will ensure it fills up the gap appropriately. Subscriber 12 is considered as S4, Subscriber 13 is associated as S10 and, because there are no more missing gaps, Subscriber 14 is associated as S12. It really does not matter in this case what is the sequence of the subscriber representations.

An embodiment of a process where a new message is published after the new subscribers are registered will now be discussed. Table 17 shows Msg3 contents as follows:

Existing Msg3 contents:
Message Header Properties
Default properties
Application specific Properties
0 0 0 1 0 0 0 0 0 1 0
Message Pay Load Bit 4 and Bit 10 are automatically set to 1 so that Subs 4 and 10 will not get the messages. At this point: (i) Total Subscription Count (TSC)=9; (ii) Max Bit Value (MBV)=11; (iii) Msg3: TSCC=0; (iv) Msg3: TSC=9. New message, Msg4, contents are as shown in Table 18:

Msg4 contents:
Message Header Properties
Default properties
Application specific Properties
0 0 0 0 0 0 0 0 0 0 0 0
Message Pay Load All Bits are set to 0 since there are now 12 active subscribers. At this point: (i) Total Subscription Count (TSC)=12; (ii) Max Bit Value (MBV)=12; (iii) Msg4: TSCC=0; and (iv) Msg4: TSC=12.

An embodiment of the process of reordering bit values to fill up the gaps with existing subscribers will now be discussed. At this point there are 12 subscribers that are active/registered. Assume that Subscribers 2, 5, 10, 11 request to be unsubscribed. However, a difference between the earlier scenario and this scenario is that there will be no new subscribers that will register. That means that bit values, 2, 5, 10 and 11 will continue to remain empty. In such situations, it is not always a good idea to have 4 additional bit values that are not required in new messages. Hence, the messaging engine will try to reorder the existing subscribers to fill up the missing bit values and thereby close the "gaps." The reordering of the bit values will be done only when all the subscribers are inactive (that is, they are not connected) and not consuming messages or during the messaging engine restart. Table 19 shows existing subscriber and message information:

| Subscriber | Bit Value | Status |
|---|---|---|
| S1 | 1 | 0 |
| S2 | 2 | 1 |
| S3 | 3 | 0 |
| S4 | 4 | 0 |
| S5 | 5 | 1 |
| S6 | 6 | 0 |
| S7 | 7 | 0 |
| S8 | 8 | 0 |
| S9 | 9 | 0 |
| S10 | 10 | 1 |
| S11 | 11 | 1 |
| S12 | 12 | 0 |

At this point: (i) Total Subscription Count (TSC)=8; and (ii) Max Bit Value (MBV)=12. Table 20 shows existing Msg3 contents:

Existing Msg3 contents:
Message Header Properties
Default properties
Application specific Properties
0 1 0 1 1 0 0 0 0 1 1
Message Pay Load Bits 2, 5, and 11 are automatically set to 1. Note that 4 and 10 were already set to 1 in the earlier run. At this point: (i) Total Subscription Count (TSC)=8; (ii) Max Bit Value (MBV)=11; (iii) Msg3: TSCC=0; and (iv) Msg3: TSC=8. Table 21 shows new message, Msg4, contents:

Msg4 contents:
Message Header Properties
Default properties
Application specific Properties
0 1 0 0 1 0 0 0 0 1 1 0
Message Pay Load Bits 2, 5, 10, and 11 are automatically set to 1. At this point: (i) Total Subscription Count (TSC)=8; (ii) Max Bit Value (MBV)=12; (iii) Msg4: TSCC=0; and (iv) Msg4: TSC=8.

An embodiment of a process where the messaging engine restarts will now be discussed. During the messaging engine restart, the messaging engine will consolidate and rearrange the existing subscriber details and messages bit values so that the missing bit values can be filled appropriately. Subscribers 2, 5, 10, 11 are unsubscribed. The missing gaps can be seen in Table 22 (initial view):

| Subscriber | Bit Value | Status |
|---|---|---|
| S1 | 1 | 0 |
| S3 | 3 | 0 |
| S4 | 4 | 0 |
| S6 | 6 | 0 |
| S7 | 7 | 0 |
| S8 | 8 | 0 |
| S9 | 9 | 0 |
| S12 | 12 | 0 |

At this point: (i) Total Subscription Count (TSC)=8; and (ii) Max Bit Value (MBV)=12. Table 23 shows Message 3 contents:

Message Header Properties
Default properties
Application specific Properties
0 1 0 1 1 0 0 0 0 1 1
Message Pay Load Bits 2, 5, and 11 are automatically set to 1. Note that 4 and 10 were already set to 1 in the earlier run. At this point for Message 3: (i) Total Subscription Count (TSC)=8; (ii) Max Bit Value (MBV)=11; (iii) Msg3: TSCC=0; and (iv) Msg3: TSC=8. Table 24 shows Message 4 contents:

Msg4 contents:
Message Header Properties
Default properties
Application specific Properties
0 1 0 0 1 0 0 0 0 1 1 0
Message Pay Load Bits 2, 5, 10 and 11 are automatically set to 1. At this point for Message 4: (i) Total Subscription Count (TSC)=8; (ii) Max Bit Value (MBV)=12; (iii) Msg4: TSCC=0; and (iv) Msg4: TSC=8. Messages 3 and 4, shown above, are the messages that exist in the messaging engine and are not consumed by other consumers.

Table 25 shows reordering the bit values:

| Subscriber | Bit Value | Status |
|---|---|---|
| S1 | 1 | 0 |
| S12->S2 | 2 | 0 |
| S3 | 3 | 0 |
| S4 | 4 | 0 |
| S9->S5 | 5 | 0 |
| S6 | 6 | 0 |
| S7 | 7 | 0 |
| S8 | 8 | 0 |

At this point: (i) Total Subscription Count (TSC)=8; and (ii) Max Bit Value (MBV)=8. Table 26 shows existing Msg3 contents:

| Message Header Properties |
| Default properties |
| Application specific Properties |
| 0   0   0   1   0   0   0   0 |
| Message Pay Load |

Bits 2 and 5 are reset to 0 because the subscribers reference was reset S12=>S2 and S9=>S5. Bits 9, 10, and 11 are removed since there are no subscribers so the MBV now becomes 8. At this point: (i) Total Subscription Count (TSC)=8; (ii) Max Bit Value (MBV)=8; (iii) Msg3: TSCC=0; and (iv) Msg3: TSC=8. Table 27 shows Msg4 contents:

| Msg4 contents: |
| Message Header Properties |
| Default properties |
| Application specific Properties |
| 0   0   0   0   0   0   0   0 |
| Message Pay Load |

Bits 2 and 5 are reset to 0 because the subscribers reference was reset S12=>S2 and S9=>S5. Bits 9, 10, 11, and 12 are removed since there are no subscribers so the MBV now becomes 8. At this point: (i) Total Subscription Count (TSC)=8; (ii) Max Bit Value (MBV)=8; (iii) Msg4: TSCC=0; and (iv) Msg4: TSC=8. Once the messaging engine restarts, all the messages and the subscribers are readjusted such that there are no missing gaps in the bit values.

Some embodiments deal with optimizing the storage of messages in a publish/subscribe environment by storing messages for the inactive subscribers without maintaining any message references and duplicating the messages or its reference for all the subscribers so that the messaging engine does not have to use up lot of disk-space.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

What is claimed is:

1. A method for managing at least a master copy of a non-transitory machine readable data file in a database according to a publication subscription system model, the method comprising:

saving the machine readable data file corresponding to a first message in the database as the master copy of the machine readable data file;

receiving a list of subscribers that subscribe to a topic of the first message;

generating consumption metadata includes data indicating whether each subscriber of the list of subscribers is has, or is likely to want to, consume the first message;

responsive to adding a new subscriber to the list of subscribers, revising the consumption metadata to include data indicating whether the new subscriber has, or is likely to want to, consume the first message;

responsive to a determination that an inactive subscriber has become inactive, revising the consumption metadata to remove data relating to the inactive subscriber;

on condition that the consumption data indicates that at least one subscriber has not, and is not likely to, consume the first message, duplicating the first message; and on condition of a determination that all subscribers have consumed the first message, deleting the master copy of the machine readable data file in the database;

wherein the consumption metadata includes a binary bit to respectively indicate consumption status for each subscriber of the plurality of subscribers.

* * * * *